F. A. ELLIS.
DETACHABLE VEHICLE WHEEL.
APPLICATION FILED MAR. 6, 1914.
1,151,450.
Patented Aug. 24, 1915.
3 SHEETS—SHEET 1.
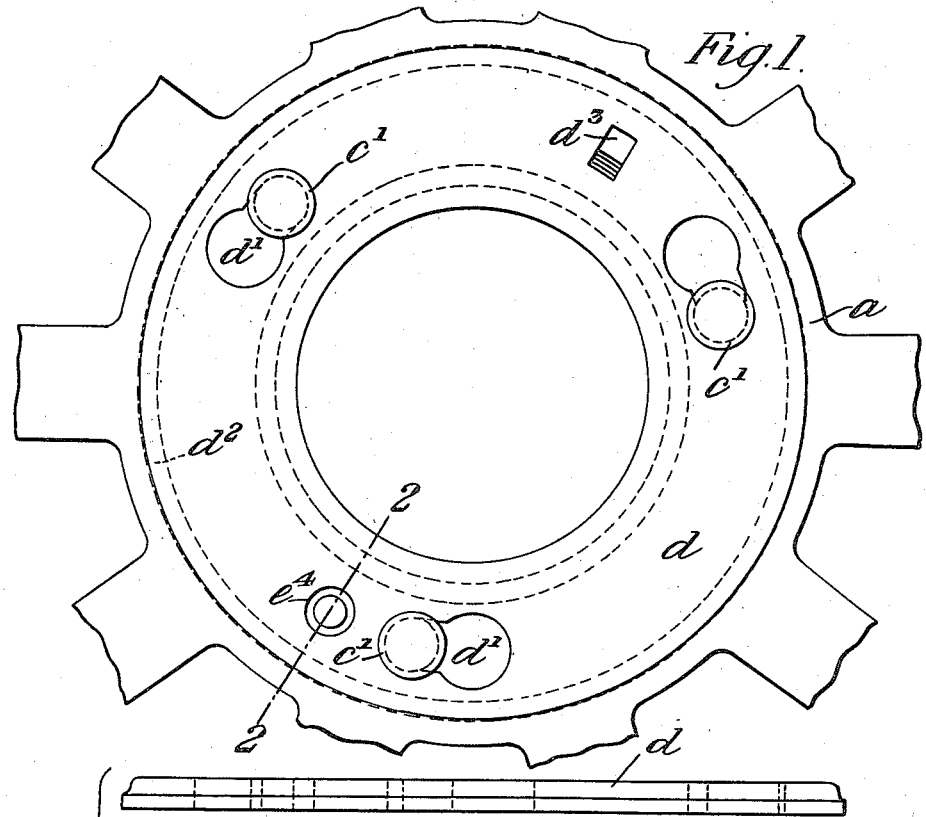
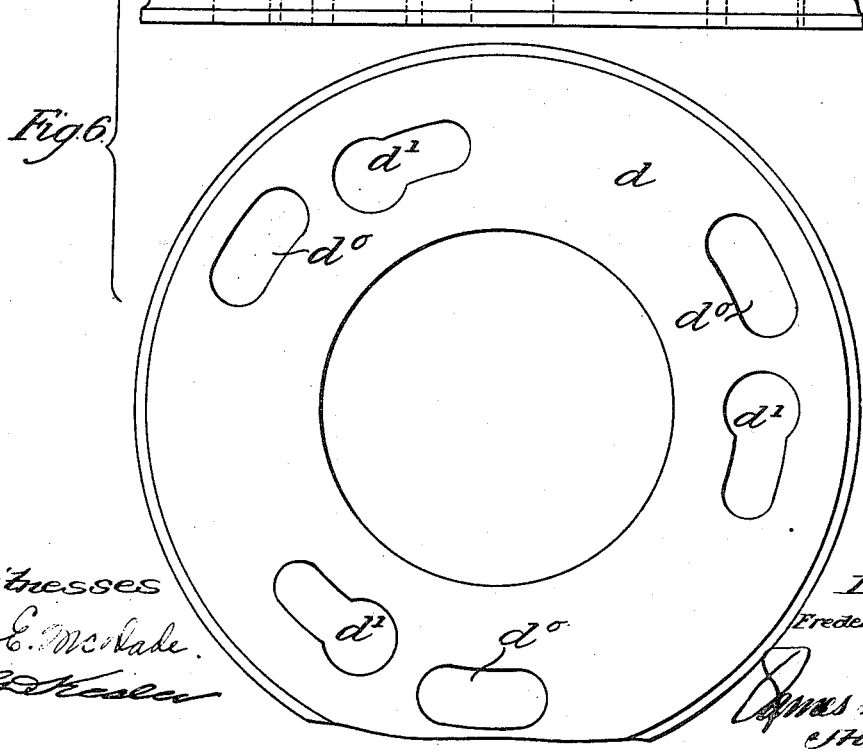

F. A. ELLIS.
DETACHABLE VEHICLE WHEEL.
APPLICATION FILED MAR. 6, 1914.
1,151,450.
Patented Aug. 24, 1915.
3 SHEETS—SHEET 2.
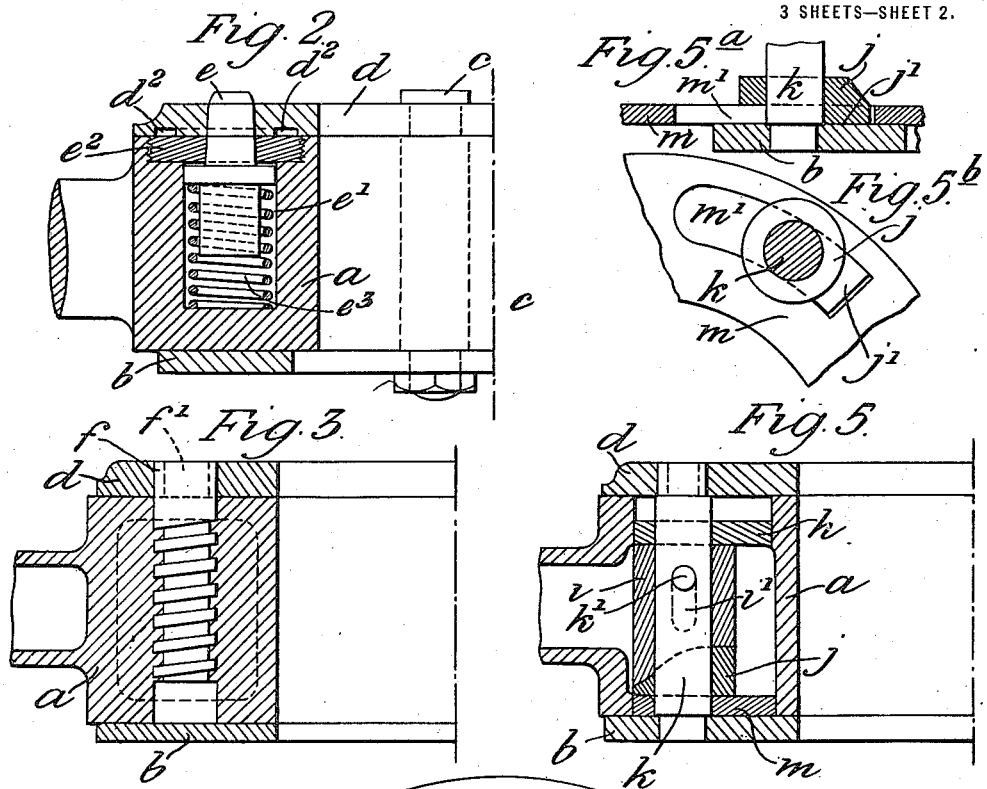
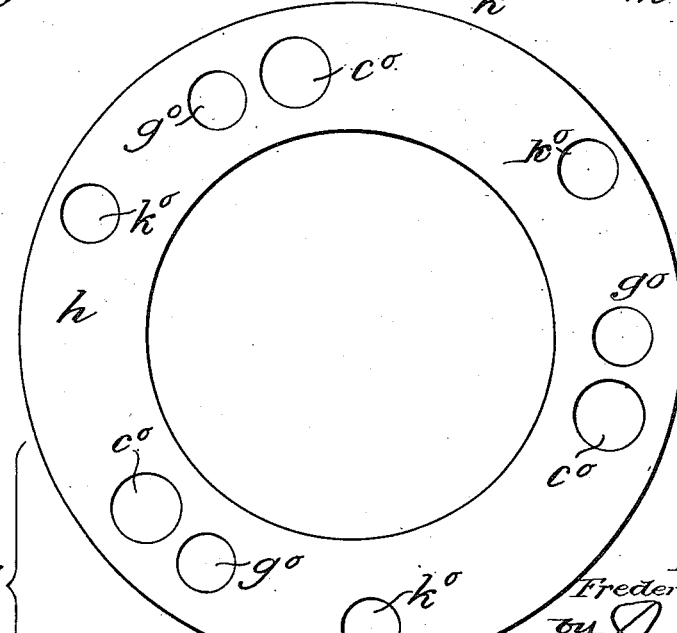
Inventor
Frederick A. Ellis
by James L. Norris
Attorney
Witnesses.
M. E. McHade F. A. ELLIS.
DETACHABLE VEHICLE WHEEL.
APPLICATION FILED MAR. 6, 1914.
1,151,450.
Patented Aug. 24, 1915.
3 SHEETS—SHEET 3.
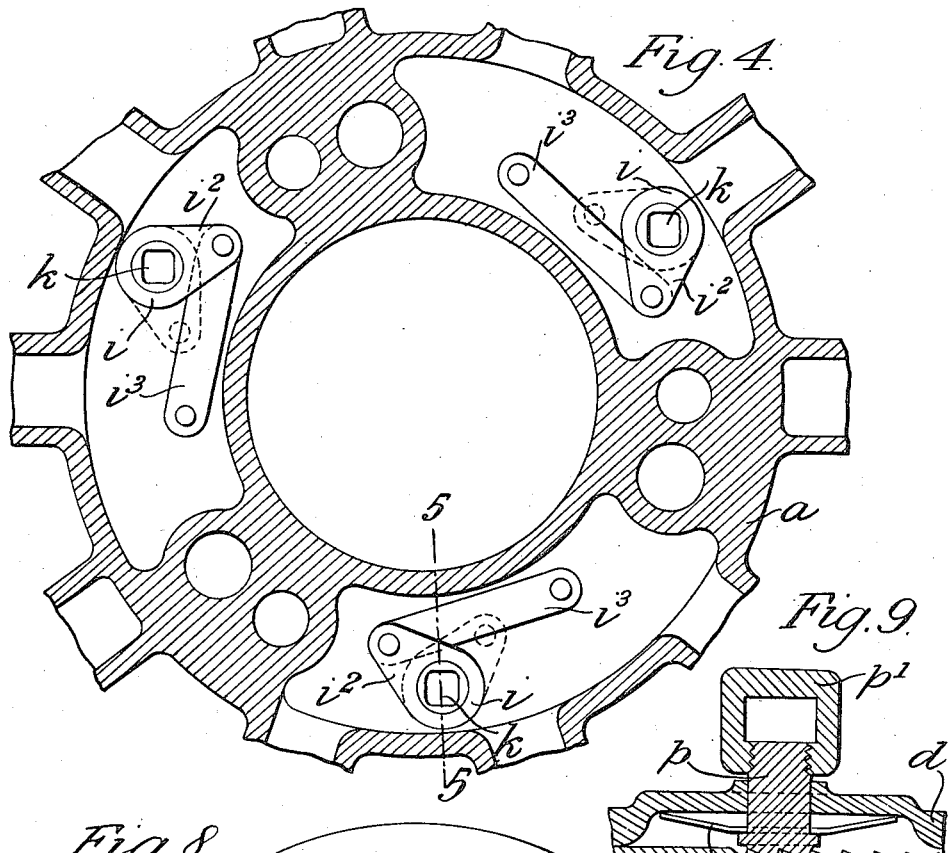
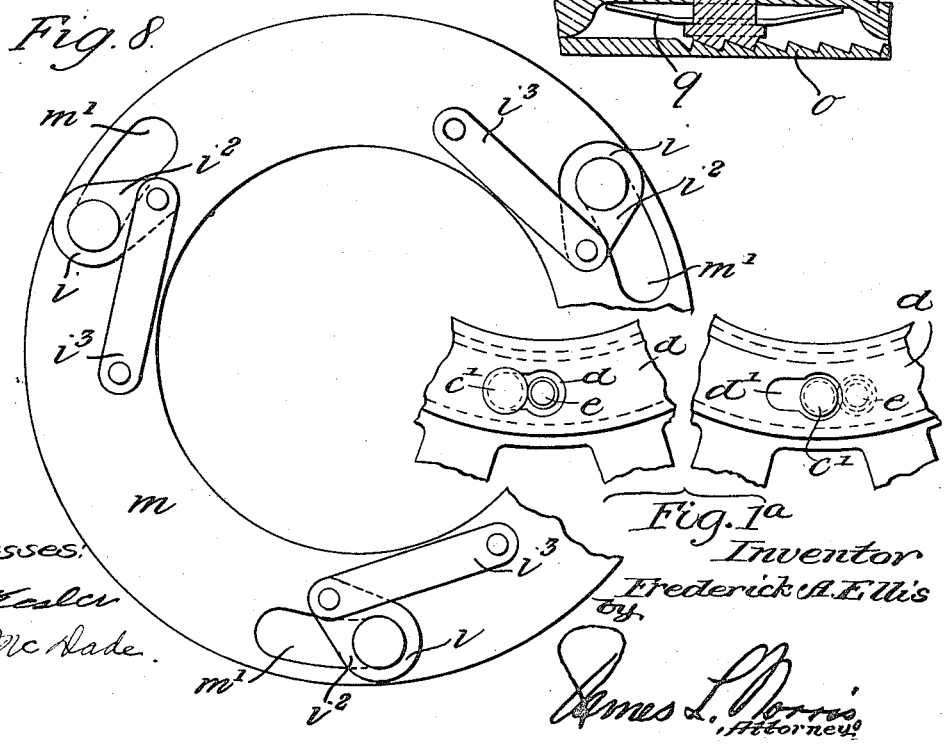

UNITED STATES PATENT OFFICE.

FREDERICK ARTHUR ELLIS, OF LONDON, ENGLAND.

DETACHABLE VEHICLE-WHEEL.

1,151,450.  Specification of Letters Patent.  Patented Aug. 24, 1915.

Application filed March 6, 1914. Serial No. 822,920.

*To all whom it may concern:*

Be it known that I, FREDERICK ARTHUR ELLIS, a subject of the King of Great Britain, residing in London, England, and whose post-office address is 19 Tregothnan road, Clapham, in the county of London, England, have invented certain new and useful Improvements in Detachable Vehicle-Wheels, of which the following is a specification.

This invention relates to detachable wheels for vehicles of the kind in which the detachable part, usually comprising hub, spokes and felly or the equivalent thereof, is carried by a plurality of driving pins or studs projecting outwardly from a permanent or non-detachable hub disk and passing through holes in the hub of the detachable wheel, which is locked against axial displacement by means of a locking ring having a number of slots so formed as to permit the ring to be passed over the ends of the driving pins and then rotated so as to engage under heads or collars, or equivalent projections, formed upon the ends of the pins, means being provided to prevent the circumferential displacement of the locking ring, as for example by one or more spring-urged pins.

The present invention comprises a wheel of this type wherein the rotation of the locking ring is prevented positively, without dependence upon an axle cap, by means of one or more locking pins accommodated within the detachable hub and removable therewith which, when the detachable wheel and locking ring are assembled, are projected either automatically by means of springs or by the application of a suitable tool, into locking engagement with the ring.

The invention further comprises a wheel of this kind wherein means are provided for simultaneously actuating two or more locking pins, and further a wheel of this kind wherein the locking pin or pins are arranged to project into the slot or slots in the locking ring in which the driving pins engage so as to provide an abutment for the latter.

These and other novel features will be described more specifically with reference to the accompanying drawings, wherein—

Figure 1 is an end elevation of the hub of a detachable wheel embodying this invention; Fig. 1ª shows part elevation of a modification of the hub of Fig. 1 with the locking means in two positions; Fig. 2 is a section on line 2—2 of Fig. 1; Fig. 3 is a view corresponding with Fig. 2 but showing a modified device for securing the locking ring in position; Fig. 4 is a vertical section through the hub of a detachable wheel showing a further modification of locking device; Fig. 5 is a section on line 5—5 of Fig. 4; Figs. 5ª and 5ᵇ are views showing details of construction not shown in Fig. 5; Fig. 6 shows in plan and elevation the locking ring for use with the hub shown in Fig. 4; Fig. 7 similar views of another ring forming part of the locking device of the construction shown in Figs. 4 and 5; Fig. 8 another part of the same device, and Fig. 9 is a section illustrating an auxiliary locking device.

Referring first to Figs. 1 and 2 $a$ represents the hub of a detachable wheel which may be of the artillery wheel type or any other kind of wheel applicable to road vehicles, $b$ represents a permanent hub disk which carries a plurality of pins $c$ which are secured to the permanent hub disk and project through holes in the deachable hub $a$, the ends of the studs projecting beyond the face of this hub and being circumferentially grooved so as to leave collars or heads $c'$ upon their projecting ends. A locking ring $d$ having slots $d'$ corresponding in number with the pins $c$ and formed with an enlargement at one end to enable the locking ring $d$ to be passed over the heads $c'$ of the studs $c$ serves, when given a partial turn, to lock the detachable hub $a$ of the permanent disk $b$ by engagement of the edges of the narrow part of the slots $d'$ under the collars or heads $c'$ of the studs. Circumferential displacement of the locking ring $d$ is prevented in the construction of Figs. 1 and 2 by a spring-urged pin or plunger $e$ which is accommodated in an axially alined recess $e'$ in the hub $a$ and is retained therein by suitable means such as the plate $e^2$ screwed over the end of the recess, which plate is formed with a hole to allow the plunger $e$ to project through it while acting as an abutment to a collar on the plunger when the latter is urged outward by the spring $e^3$.

When the locking ring $d$ is rotated into the position shown in Figs. 1 and 2, the plunger $e$ comes into register with a hole $e^4$ in the locking ring and under the action of the spring $e^3$ is projected through the hole, thereby locking the ring $d$ against circumferential movement. The plunger $e$ is preferably slightly tapered, as is also the hole $e^4$ in the locking ring in which it engages so as to take up any slight wear there may be. Further, the locking ring $d$ may have one or more circumferential grooves $d^2$ on its under face to accommodate a spring ring or rings adapted to take up any looseness due to wear between the locking ring and the wheel hub.

To remove the wheel a suitable tool is provided for depressing the plunger $e$ clear of the locking ring $d$, and preferably an undercut recess $d^3$ is formed in the locking ring $d$ as a fulcrum for the nose of this tool. Instead of a single spring bolt $e$, two or more may be provided, the tool for depressing them being modified accordingly. Further, the spring bolt or bolts may be arranged in the detachable hub to project into and fill the clearance space of the slots $d'$ in the locking ring when the latter is assembled in the locked position as shown in Fig. 1$^a$.

In lieu of the spring bolts or plungers $e$ one or more screwthreaded pins or bolts such as $f$ (Fig. 3) may be substituted, the outer end of such bolts being formed with a square hole $f'$ or equivalent device for the application of a tool which is inserted through the corresponding hole in the locking ring $d$ when the latter is in the operative position and the said hole or holes register with the screwthreaded pins, so as to enable the pins $f$ to be screwed outwardly until flush with the locking ring $d$, thereby holding the latter against circumferential displacement.

The locking pins $f$, when more than one are used, may be independently screwed into the locking position, or any suitable device may be adopted for operating the pins simultaneously. As in the case of the spring pins $e$, the screwthreaded pins $f$ may be arranged to occupy the clearance space in the slots $d'$ of the locking ring when the latter is in the locking position.

In the modified construction of Figs. 4, 5, 7 and 8 the pins $g$ which secure the locking ring $d$ against circumferential displacement are carried upon and project outwardly from a ring $h$ which is axially movable by the operation of sleeves $i$ the lower ends of which are beveled or cam-shaped and rest upon correspondingly shaped cam studs or sleeves $j$. Within the sleeves $i, j$ and stepped in the permanent hub plate $b$ are studs $k$ the outer ends of which have a bearing in arc-shaped slots $d^0$ in the locking plate $d$ and have square recesses in their ends whereby they may be rotated by means of a suitable key. Projecting outwardly from each of these studs $k$ is a pin $k'$ which engages a vertical slot $i'$ formed in each of the sleeves $i$, so that when the studs $k$ are rotated about their axis the sleeves $i$ turn with them and, riding upon the cams $j$, force the plate $h$ outwardly so as to project the heads of the locking pins $g$ into holes or recesses in the locking ring $d$, for example the clearance space left in the slots $d'$ when the locking ring is turned to the operative position. The actuation of one of the studs $k$ by means of a suitable tool causes the other sleeves $i$, besides the one associated with the particular stud which is being actuated, to rise upon their cams $j$ by reason of the fact that each of the sleeves $i$ has a crank $i^2$ which is connected by a link $i^3$ with a ring or plate $m$ situated below the cams $j$ and slotted, as shown at $m'$, to allow rotation of the ring within the necessary limits. This rotation of the ring, consequent upon the actuation of one of the studs $k$, operates the other sleeves $i$ which therefore rise upon the corresponding cams $j$ to thrust the ring $h$ outwardly so as to project the studs $g$ carried thereby into the locking recesses of the locking ring $d$.

Rotation of the cam sleeves $j$ is prevented by providing them with a tooth $j'$ which projects downwardly into the slot $m'$ of the ring $m$, as shown in Figs. 5$^a$ and 5$^b$. The driving pins $c$ are not shown in Figs. 3 to 8, but it will be understood that they project from the fixed hub plate $b$ through the holes in the several parts marked $c^0$, while the pins $g$ pass through the holes in the several parts marked $g^0$, and the actuating pins $k$ pass through the holes in the ring $h$ marked $k^0$.

The device shown in section in Fig. 9 for preventing accidental circumferential movement of the locking ring $d$ may be used as an alternative or in addition to the locking pin or pins previously described. When used in addition to such locking pin or pins it operates to prevent a releasing movement of the locking plate $d$ when the latter has been turned through an insufficient angle to permit the locking pin or pins to be projected into the aperture or apertures in the locking ring with which they coöperate. As shown, the device consists of a circumferential or arc-shaped ratchet $o$ formed upon or attached to the face of the removable hub and a coöperating pawl $p$ slidably mounted in a hole in the locking ring $d$ and normally urged, by means of a spring $q$, into engagement with the ratchet $o$. The spring $q$ may be conveniently a flat spring which is accommodated in a recess or cavity formed on the inner side of the locking ring $d$, and the head of the pawl $p$ is preferably provided with an eyepiece $p'$ whereby the pawl may be retracted when it is desired to rotate the locking ring into the unlocking position.

The disposition of the ratchet and pawl is such that they become operative as soon as the locking ring is turned out of the locking position, so that even although, through carelessness, the ring should not be turned far enough to permit the locking pin or pins to engage, reverse movement of the ring is prevented by the action of the pawl. The release of the pawl may be effected by means of the same key or lever which is used to depress the locking pin $e$ (Figs. 1 and 2), an extension of this lever engaging the eye-piece $p'$ of the pawl head being provided for the purpose.

Having thus described the nature of this invention and the best means I know of carrying the same into practical effect I claim:—

1. A detachable wheel for road and other vehicles, comprising a fixed hub, a removable hub having a series of axially alined holes and also a separate axially alined recess, a locking ring having a number of holes, driving pins secured to the fixed hub and passing through the holes in the removable hub and locking ring, and a locking member accommodated in the said recess and adapted to engage the locking ring when the latter has been given a partial turn and thereby prevent accidental circumferential displacement of the same.

2. A detachable wheel for road and other vehicles, comprising a fixed hub, a removable hub having a series of axially alined holes and also a separate series of axially alined recesses, a locking ring having a number of holes, driving pins secured to the fixed hub and passing through the holes in the removable hub and locking ring, a plurality of locking pins arranged in said recesses and adapted to engage in the locking ring, and means for actuating said locking pins simultaneously.

3. A detachable wheel for road and other vehicles comprising a fixed hub, a removable hub having a series of axially alined recesses, a locking ring provided with key-hole slots having each a broad part and a narrow part, driving pins secured to the fixed hub and passing through holes in the removable hub and the broad parts of the key-hole slots in the locking ring, and a plurality of locking pins arranged in the recesses in the removable hub and adapted each to be projected into the broad parts of the key-hole slots in the locking ring when the latter has been given a partial turn so that the narrow parts of the slots engage the driving pins.

4. A detachable wheel for road and other vehicles, comprising a fixed hub, a removable hub, a locking ring, driving pins secured to the fixed hub and passing through holes in the removable hub and locking ring, a plurality of locking pins coöperating with the locking ring, and cam devices for actuating said locking pins simultaneously.

5. A detachable wheel for road and other vehicles, comprising a fixed hub, a removable hub having an axially alined recess, a locking ring, driving pins secured to the fixed hub and passing through holes in the removable hub and locking ring, an axially movable ring disposed within said recess and carrying a plurality of outwardly projecting locking pins coöperating with the locking ring and means for shifting the said movable ring axially to project the locking pins into holes in the locking ring.

6. A detachable vehicle wheel comprising a fixed hub, a removable hub, driving means secured to the fixed hub and adapted to coöperate with the removable hub, a locking ring capable of partial rotation to lock the fixed and removable hubs together, a locking device for said ring operative when the latter has been partially rotated to a predetermined degree, and means operative automatically to lock said ring relatively to the removable hub when said ring is partially rotated to a degree insufficient to cause locking of the ring by said locking device.

7. A detachable wheel for road and other vehicles comprising a fixed hub, a removable hub having a series of axially alined holes and also a separate axially alined recess, a locking ring having a number of holes, driving pins secured to the fixed hub and passing through the holes in the removable hub and locking ring, a locking pin in the removable hub recess adapted to be projected into a hole in the locking ring when the latter has been given a partial turn, and means operative automatically to lock the locking ring relatively to the removable hub when the former is given a partial turn that is insufficient to cause coöperation of said locking pin with the locking ring.

In testimony whereof I have signed my name to this specification in the presence of two subscribing witnesses.

FREDERICK ARTHUR ELLIS.

Witnesses:
JOSEPH MILLARD,
WALTER J. SKERTEN.